United States Patent
Khanolkar et al.

(10) Patent No.: US 11,650,897 B2
(45) Date of Patent: *May 16, 2023

(54) EVENT VISUALIZATION FOR ASSET CONDITION MONITORING

(71) Applicant: Baker Hughes Holdings LLC, Houston, TX (US)

(72) Inventors: Shamika Khanolkar, Mumbai (IN); Jackie Tappan, Houston, TX (US); Jojy Chakkalackal, Bangalore (IN); Chelsea O'Bryan, Minden, NV (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,863

(22) Filed: Jun. 30, 2021

(65) Prior Publication Data
US 2023/0004470 A1    Jan. 5, 2023

(51) Int. Cl.
| | | |
|---|---|---|
| *G06F 11/00* | (2006.01) | |
| *G06F 11/30* | (2006.01) | |
| *G06F 11/34* | (2006.01) | |
| *G06F 11/32* | (2006.01) | |

(52) U.S. Cl.
CPC ........ *G06F 11/3072* (2013.01); *G06F 11/327* (2013.01); *G06F 11/3409* (2013.01); *G06F 2201/86* (2013.01)

(58) Field of Classification Search
CPC . G06F 11/3072; G06F 11/327; G06F 11/3409
See application file for complete search history.

(56) References Cited

U.S. PATENT DOCUMENTS

| | | |
|---|---|---|
| 10,409,809 B2 | 9/2019 | Schindlauer et al. |
| 10,459,432 B2 | 10/2019 | Mohanty |
| 10,528,234 B2 | 1/2020 | Brown et al. |
| (Continued) | | |

OTHER PUBLICATIONS

Komljenovic, et al., "Risks of extreme and rare events in Asset Management," Safety Science, vol. 88 (2016) pp. 129-145.

(Continued)

*Primary Examiner* — Elmira Mehrmanesh
(74) *Attorney, Agent, or Firm* — Mintz Levin Cohn Ferris Glovsky and Popeo, PC

(57) ABSTRACT

Systems and methods for asset management are provided. Event data characterizing events experienced by assets distributed among different sites of a fleet is maintained. The event data includes an asset location within an asset hierarchy of the fleet and an event parameter corresponding to the event. A graphical user interface (GUI) is generated that displays a first window including a hierarchical list of assets organized according to their position within the asset hierarchy. When the GUI receives a selection of a level within the hierarchical list, events associated with the selected level can be identified. Identified events can be classified based upon their event data as a unique event having a single occurrence or a repeat event having multiple occurrences. In response to receipt of the selection, the GUI is updated to display a second window listing single entries for respective unique events and single entries for respective repeat events.

20 Claims, 5 Drawing Sheets

(56) References Cited

U.S. PATENT DOCUMENTS

| | | | |
|---|---|---|---|
| 10,885,451 B2 | 1/2021 | Guruswamappa et al. | |
| 2004/0186927 A1* | 9/2004 | Eryurek ............. | G05B 23/0278 |
| | | | 710/13 |
| 2007/0240071 A1* | 10/2007 | Sherrill .............. | G05B 23/0267 |
| | | | 715/764 |
| 2009/0216698 A1 | 8/2009 | Bouchard et al. | |
| 2014/0108985 A1* | 4/2014 | Scott .................. | G05B 19/4188 |
| | | | 715/771 |
| 2019/0102074 A1* | 4/2019 | Uy ........................ | G06F 40/166 |
| 2020/0135006 A1* | 4/2020 | Costello ............... | G08B 25/001 |

OTHER PUBLICATIONS

Xu, et al., "Detecting rare events using Kullback-Leibler divergence: A weakly supervised approach," Expert Systems With Applications, vol. 54 (2016), pp. 13-28.

M.R. Naphade and T.S. Huang, "Discovering recurrent events in video using unsupervised methods," Proceedings. International Conference on Image Processing, IEEE, vol. 2, Dec. 10, 2002, pp. 11-13 to 11-16.

\* cited by examiner ively analyze the cause triggering the event. Furthermore, existing condition monitoring systems often present events as a list. Thus, when repeated events are logged, it can be difficult to find the unique events responsible for triggering the event.

EVENT VISUALIZATION FOR ASSET CONDITION MONITORING

BACKGROUND

Many industries, such as hydrocarbon extraction, refining, and power generation, can rely heavily upon operation of assets (e.g., machinery), and in some instances, continuous operation of such assets. In these environments, unplanned asset shutdown and/or failure can incur severe consequences, ranging from expenses due to loss of production and/or expenses, to potential injury to workers, amongst others. Given these risks, it can be common to monitor selected parameters of various assets during operation. Measurements of the operating parameters can provide an indication of the condition of a respective asset components, as well as the asset as a whole. As a result, deviations in asset operation from normal operation can be identified and addressed to avoid asset shutdown and/or failure. Thus, asset condition monitoring can provide a variety of long term benefits, such as lower production costs, reduced equipment down time, improved reliability, and enhanced safety.

SUMMARY

Condition monitoring systems can be configured to report a variety of events characterizing deviation in asset performance from pre-determined normal operation conditions. As an example, set points can be used to define a normal operation range and measurement of operating parameters outside of this range can be flagged as an event. However, it can be appreciated that, under circumstances where measured operating parameters fluctuate about a set point, event logs can become filled with more events than are necessary for an operator to efficiently analyze the cause triggering the event. Furthermore, existing condition monitoring systems often present events as a list. Thus, when repeated events are logged, it can be difficult to find the unique events responsible for triggering the event.

In addition, many condition monitoring platforms do not combine events with supporting data, and can require an operator to navigate between different applications and/or computing devices to compare event details, to supporting data. This scenario increases the time necessary for an operator to gather the information needed to diagnose event triggers, which can be undesirable under time-sensitive circumstances.

Accordingly, as discussed in detail below, systems and methods for improved visualization of events logged by a condition monitoring system provided herein.

In an embodiment, an asset management system is provided and can include a historian and an event analyzer. The historian can be configured to maintain a plurality of event data characterizing one or more events experienced by respective assets of a plurality of asset. The plurality of assets can be distributed among different sites of a fleet, and the event data can include at least a location of the asset within an asset hierarchy of the fleet and at least one event parameter corresponding to the event. The event analyzer include one or more processors configured to receive the plurality of event data and to perform a perform operations including generating a graphical user interface (GUI) displaying a first window. The first window can include a hierarchical list of assets organized according to their position within the asset hierarchy of the fleet. The operations can further include receiving, within the GUI, a first user selection of a hierarchical level within the hierarchical list.

The operations can additionally include identifying a plurality of events associated with the hierarchical level of the first user selection. The operations can further include classifying at least a portion of the identified plurality of events based upon their respective event data as either a unique event having a single occurrence within the plurality of events or a repeat event having multiple occurrences within the plurality of events. The operations can additionally include updating the GUI to display a second window in response to receipt of the first user selection. The second window can include a list including a single entry for respective unique events and a single entry for respective repeat events of the first plurality of events.

In another embodiment, the event analyzer can be further configured to perform operations including receiving, within the GUI, a second user selection of an event from the list, and updating the GUI to display at least one third window in response to receipt of the second user selection. The third window can include event data corresponding to the selected event.

In another embodiment, the third window can include a first sub-window displaying a most recent occurrence of the selected event including a first portion of the at least one event parameter.

In another embodiment, the event data can further include at least one recommendation, and the third window can include a second sub-window displaying the at least one recommendation.

In another embodiment, the third window can include a third sub-window displaying all occurrences of the selected event and each displayed occurrence can include respective second portions of the at least one event parameter for each occurrence.

In another embodiment, the event data can further include measured operating data regarding the asset before, during, and after the selected event, and the third window can further include a fourth sub-window including a plot displaying at least a portion of the measured operating data.

In another embodiment, the event analyzer can be further configured to perform operations including updating the GUI to display a fourth window in response to receipt of the first user selection. The fourth window can include a performance summary at the selected hierarchy level based upon the event data corresponding to the first plurality of events.

In another embodiment, the asset hierarchy of the fleet can include two or more of a fleet level, a site level, an asset group level, or an asset level.

In another embodiment, the event analyzer can be configured to classified an event as a unique event when the at least one event parameter corresponding to the event does not match another event of the plurality of events. The event analyzer can be further configured to classify an event as a repeat event when the least one event parameter corresponding to the event matches all of the at least one event parameter of another event of the plurality of events.

In another embodiment, the at least one event parameter can include at least one of a measurement type, a measurement point, an event type, an event level, an event source, or an asset state.

In another embodiment, an event can be at least one of an alarm, a condition monitoring system health event, an instrument health event, or an analytical health event.

In another embodiment, a method of asset management is provided. The method can include maintaining, by one or more processors, a plurality of event data characterizing one or more events experienced by respective assets of a plurality of assets. The plurality of assets can be distributed among different sites of a fleet, and the event data can include at least a location of the asset within an asset hierarchy of the fleet and at least one event parameter corresponding to the event. The method can also include receiving, by one or more processors, the plurality of event data. The method can further include generating, by the one or more processors, a graphical user interface (GUI) displaying a first window. The first window can include a hierarchical list of assets organized according to their position within the asset hierarchy of the fleet. The method can additionally include receiving, within the GUI, a first user selection of a hierarchical level within the hierarchical list. The method can additionally include identifying, by the one or more processors, a plurality events associated with the hierarchical level of the first user selection. The method can also include classifying, by the one or more processors, at least a portion of the identified plurality of events based upon their respective event data as either a unique event having a single occurrence within the plurality of events or a repeat event having multiple occurrences within the plurality of events. The method can further include updating, by the one or more processors, the GUI to display a second window in response to receipt of the first user selection. The second window can include a second list including a single entry for respective unique events and a single entry for respective repeat events of the first plurality of events.

In another embodiment, the method can further include receiving, within the GUI, a second user selection of an event from the second list. The method can additionally include updating, by the one or more processors the GUI to display at least one third window in response to receipt of the second user selection, and the third window can include event data corresponding to the selected event.

In another embodiment the third window comprises a first sub-window displaying a most recent occurrence of the selected event including a first portion of the at least one event parameter.

In another embodiment, the event data can further include at least one recommendation, and the third window can include a second sub-window displaying the at least one recommendation.

In another embodiment, the third window can include a third sub-window displaying all occurrences of the selected event and each displayed occurrence can include respective second portions of the at least one event parameter for each occurrence.

In another embodiment, the event data can further include measured operating data regarding the asset before, during, and after the selected event, and the third window can include a fourth sub-window including a plot displaying at least a portion of the measured operating data.

In another embodiment, the method can further include updating, by the one or more processors, the GUI to display a fourth window in response to receipt of the first user selection. The fourth window can include a performance summary at the selected hierarchy level based upon the event data corresponding to the first plurality of events.

In another embodiment, the asset hierarchy of the fleet can include two or more of a fleet level, a site level, an asset group level, or an asset level.

In another embodiment, an event can be classified by the one or more processors as a unique event when the at least one event parameter corresponding to the event does not match another event of the plurality of events. In a further embodiment, event can be classified by the one or more processors as a repeat event when the least one event parameter corresponding to the event matches all of the at least one event parameter of another event of the plurality of events.

In another embodiment, the at least one event parameter can include at least one of a measurement type, a measurement point, an event type, an event level, an event source, or an asset state.

In another embodiment, an event can be at least one of an alarm, a condition monitoring system health event, an instrument health event, and an analytical health event.

BRIEF DESCRIPTION OF THE DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Assets (e.g., machines, machine components, etc.) can be monitored by one or more sensors to ensure they are operating properly. Condition monitoring systems can be used to review sensor measurements, detect when an asset is operating abnormally, and determine whether or not to log an event (e.g., an alarm). Logged events can be reviewed by operating engineers to determine whether action should be taken regarding an event (e.g., shutdown, scheduling maintenance, etc.) Existing condition monitoring systems can present events as a list. However, under some circumstances (e.g., when an asset shifts repeatedly between operating normally and abnormally), similar events can be logged repeatedly. As a result, event logs can become filled with more events than are necessary for an operator to efficiently analyze the cause triggering the event. Furthermore, it can be difficult to find unique events responsible for triggering the event.

Accordingly, improved systems and methods for visualizing events are provided. In one aspect, event data from multiple condition monitoring systems can be displayed. This is an improvement over existing condition monitoring systems that are designed to only visualize event data acquired at their local site. In another aspect, events can be reviewed and classified as either being unique or repeated. When displaying events for viewing by an operator, repeated events can be aggregated into a single item. The ability to aggregate repeated events can improve the efficiency of operators employing the event visualization system, as repeated events can be reviewed together without the need for additional searching. In a further aspect, a displayed event can be selected to view further details regarding the event, facilitating ease of review. In contrast, existing condition monitoring systems can lack the ability to obtain and display such detailed event data, or at the very least, can require an operator to switch between multiple applications on the user computing device.

Embodiments of systems and corresponding methods for visualization of events for condition monitoring are discussed herein. However, embodiments of the disclosure can be employed to for visualization of other data without limit.

Figure 1:
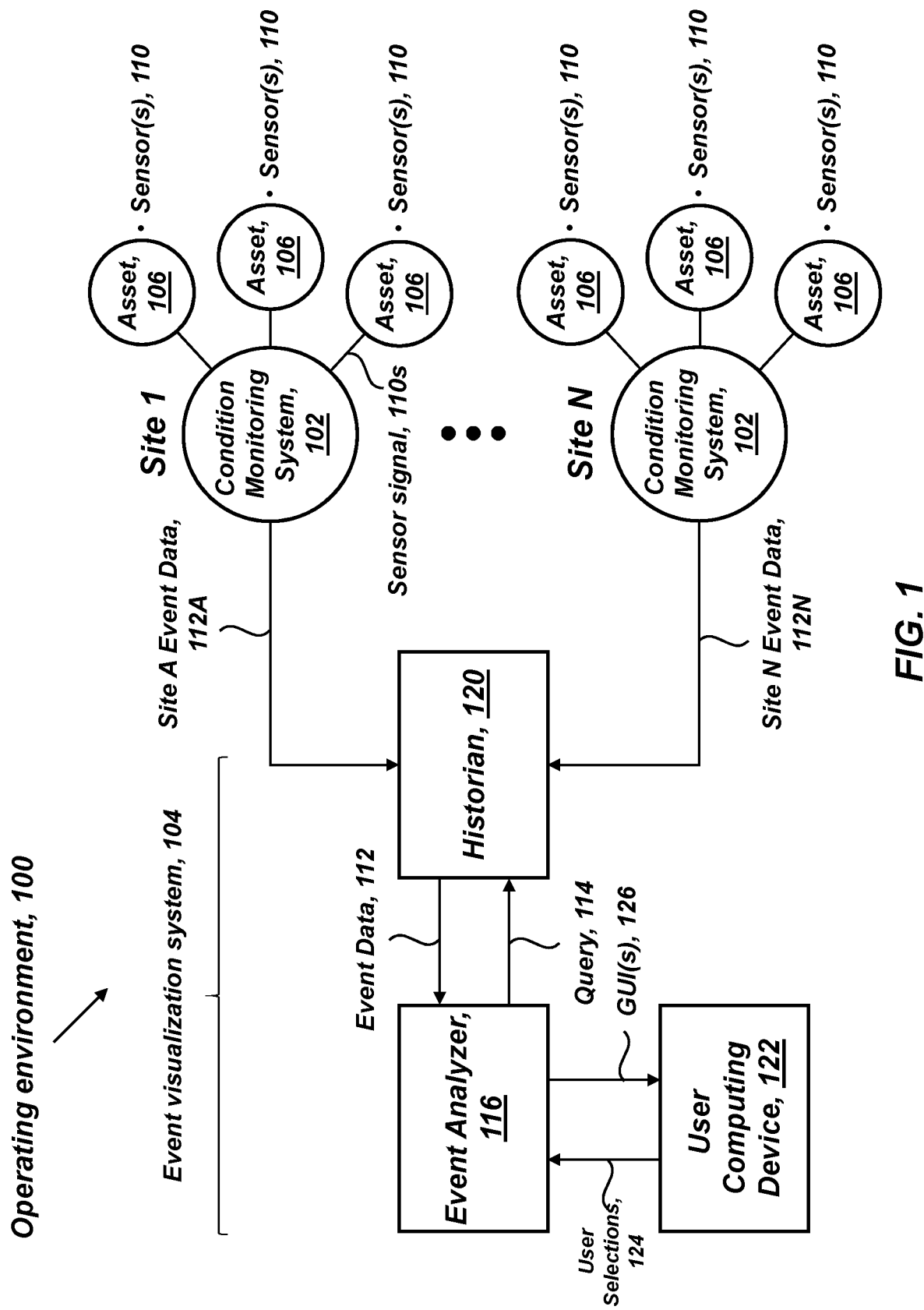
FIG. 1 is a schematic diagram illustrating one exemplary embodiment of an operating environment including an improved visualization system for condition monitoring of an asset including an event analyzer.

FIG. 1 is a schematic diagram illustrating one exemplary embodiment of an operating environment 100 including one or more condition monitoring systems 102 in communication with an event visualization system 104. As shown, a plurality condition monitoring systems 102 are provided, each present at a respective site (e.g., Site 1, Site 2, . . . Site N) including one or more assets 106.

Embodiments of the assets 106 can include any machine or machine component for which monitoring is desired. In certain embodiments, the assets 106 can be machines including rotating components, reciprocating components, and/or fixed asset components. Such components can include, but are not limited to, gears, bearings, and shafts, amongst others. Examples of machines containing such components can include, but are not limited to, turbomachines, turbines (e.g., hydro, wind), generators, and reciprocating compressors, amongst others.

As discussed in greater detail below, the assets 106 can be arranged in an asset hierarchy including a plurality of levels. The lowest level of the asset hierarchy can be the asset components. The next level up from asset components can be the asset level, which encompasses all of the components of a respective asset. As an example, for a recycle compressor asset, asset components can include a motor, a gearbox, and a compressor. The next level up from assets 106 can be the asset group level. Assets 106 can be grouped according to any predetermined criteria, such as functionality or process. In one example, a hydrocracker asset group can include respective assets 106 such as a recycle compressor, a make-up compressor, and a charge pump. The next level up from asset groups can be the site level, which can include all assets associated with a site. As an example, a refinery site can include asset groups such as alkylation, atmospheric distillation, coker, fluidic catalytic cracking, hydrocracker, reformer, and vacuum distillation. The final level up from sites can be the fleet level, which includes all assets 106 at all sites. It can be appreciated that the examples above are provided for illustration and that the asset hierarchy can include any number of levels, as necessary.

Each of the condition monitoring systems 102 can be in communication with respective sensors 110 that are configured to sense one or more operating parameters of a target one of the assets 106. The sensors 110 can be further configured to generate at least one sensor signal 110s representing the measured operating parameter, and to transmit sensor signals 110s to a respective condition monitoring system 102 (e.g., via field wiring). As an example, the sensors 110 can include a probe, a transducer, and a signal conditioning circuit (not shown). The probe can interact with the asset 106 for measurement of the operating parameter. The transducer can convert measurements of the operating parameter into an electrical signal (e.g., a voltage), and the signal conditioning circuit can condition and/or amplify the electrical signal to generate the sensor signals 110s (e.g., a voltage ranging between a minimum and maximum). Thus, in one aspect, the sensor signals 110s can contain the direct or raw measurement made by the sensor transducer. The sensor signals 110s can be an analog signal or a digital signal.

In another aspect, the sensor signals 110s can include information in addition to the direct measurements of an operating parameter. As an example, the sensor signals 110s can include metadata regarding one or more components of the corresponding sensors 110, such as the transducer. Examples of metadata can include, but is not limited to, one or more of a serial number, revision number, operating temperature, and state of health.

The number and type of sensors 110 can be dictated by the operating parameter(s) that are intended to be measured. In one aspect, the sensors 110 can take the form of one or more proximity probes for measurement of vibration, position, speed, direction of motion, and eccentricity. In another aspect, the sensors 110 can take the form of one or more accelerometers for measurement of seismic vibration and acceleration. In a further aspect, the sensors 110 can take the form of one or more temperature probes or pressure probes for measurement of temperature and pressure, respectively. It can be understood that the types of sensors 110 and corresponding measured operating parameters discussed above are not exhaustive and embodiments of the sensors 110 can include any sensor or combination of sensors suitable for measurement of operating parameters of interest.

In use, the condition monitoring system 102 can be configured to analyze the received sensor signals 110s and identify events regarding the corresponding monitored assets 106. As an example, the condition monitoring system 102 can be configured to determine a value characterizing an operating parameter measurement. The condition monitoring system 102 can also be configured to compare determined values to one or more corresponding predetermined set points or other conditions (e.g., alarm conditions) to determine an alarm status (e.g., OK, Not OK, over, under, etc.) As an example, OK/Not OK can represent a pass/fail condition, while over/under can represent measurement of one or more operating parameters over a set point or under a set point respectively.

For instance, when the asset 106 is a rotating shaft and the measured operating parameter is radial vibration of the shaft, the sensor signal 110s can include measurements of displacement of the shaft as a function of time. From the sensor signals 110s, the condition monitoring system 102 can determine the value of vibration amplitude from the peak-to-peak displacement. Under circumstances where the alarm status indicates operation of the asset 106 outside of a normal operating range, the condition monitoring system 102 can log the alarm as an event.

In further embodiments, the condition monitoring system 102 can be configured to analyze operational parameters received from multiple sensors 110 using defined logic and/or models to extract advanced insights of asset fault conditions. These operational parameters can be measured from a single component/asset or multiple components/assets.

The condition monitoring system 102 can be further configured to perform monitoring of in a similar fashion upon itself. The additional monitoring can be grouped into a variety of categories and can include, but is not limited to, system health, instrument health, and analytical health.

System health can include the health of any aspect of the hardware and/or software supporting the functionality of the condition monitoring system 102. The condition monitoring system 102 can receive data from its software/hardware and employ this data in conjunction with set points or other programmed logic to determine whether a system health event has occurred and should be logged. Examples of system health can include, but are not limited to, configuration settings, loss of communication, drivers, firmware/hardware updates, data wrapping/loss, etc.

Instrument health can include any aspect of the operation of the sensors 110 to collect sensor data. The condition monitoring system 102 can receive metadata from the sensors 110 regarding their operation and employ this data in conjunction with set points or other programmed logic to determine whether an instrument health event has occurred and should be logged. Examples of instrument health can include, but are not limited to, instrument faults, instrument OK status, and instrument communication status.

Analytical health can include the logic employed for identifying events (e.g., alarms and additional monitoring). As an example, rules/criteria defining when the condition monitoring system 102 logs an event (e.g., an event source) can be prepared by one or more authorized parties, such as a manufacturer, owner, operator of the condition monitoring system. The condition monitoring system 102 can receive metadata regarding logic employed for event identification and employ this data in conjunction with predetermined set points or other criteria defining normal and abnormal operation of event identification logic determine whether an event has occurred and should be logged. Examples of analytical health can include, but are not limited to presence/absence of event identification logic.

In general, regardless of the event type, when an event is logged, selected event data regarding that event can be recorded. Examples of event data can include, but are not limited to, a location of the affected asset within the asset hierarchy of the fleet, and at least one event parameter corresponding to the event (e.g., an operating parameter measurement in the case of an alarm event). The event parameters can optionally include one or more of the following:

Event name: A name of the identified event.

Asset state: An operating state of the asset to which the event pertains. Examples can include, but are not limited to, startup, running (normal operation), shutdown, etc.

Measurement type and measurement point: The measurement type is the category of measurement used to identify the event (e.g., vibration, temperature, pressure, etc.) The measurement point is a channel used to acquire the values for the measurement type (e.g., the sensor(s) 110).

Event Trigger: One or more set points used to identify the event.

Event type: A classification of the event (e.g., NOT OK, over, under, etc.),

Event source: One or more logic packages employed to identify an event. Such logic packages can be received from a variety of sources, including but not limited to, manufacturers, owners, and/or operators of the condition monitoring system.

Event time: A time or time duration at which the event occurred (e.g., entered time, exited time, etc.)

Event level: A relative measure of priority of the event. The event level can be determined by the condition monitoring system 102 after an event has been identified.

Event parameter measurement(s): The operating parameter measurement(s) used to identify the event. When the event is transitory, the operating parameter measurement(s) can be a single operational parameter measurement(s) Alternatively, when the event persists, the operating parameter measurement(s) can be a plurality of operating parameter measurements acquired during at least a portion of the event (e.g., operational parameter measurements acquired between the event entered time and the event exited time)

Each condition monitoring system 102 can be configured to output the event data logged for assets 106 of its respective site. In certain embodiments, as shown in FIG. 1, the event visualization system 104 can be in communication with the plurality of condition monitoring systems 102 and the event data can be received therefrom (e.g., site 1 event data 112A, site N event data 112N, collectively event data 112). In alternative embodiments, not shown, the condition monitoring system can output the event data to another computing device. Subsequently, the condition monitoring system can retrieve the event data.

As shown, the event visualization system 104 includes an event analyzer 116 in communication with a historian 120, and a user computing device 122. The historian 120 can be configured to store event data 112 received from the plurality of condition monitoring systems 102. The event analyzer 116 can be configured to submit queries 114 to the historian 120 for event data 112. Subsequently, the event analyzer 116 can generate graphical user interfaces (GUIs) 126 based upon the received event data 112 and transmit the GUIs 126 to the user computing device 122 for display. The user computing device 122 can be configured to display GUIs 126 generated by the event analyzer 116, as well as receive user selections within the GUI 126.

A hierarchical list of the assets within the fleet, arranged in levels as discussed above, can be displayed within the GUI 126. In response to receipt of a user selection of a hierarchical level within this list, the event analyzer 116 can be configured to identify a plurality of events associated with the selected hierarchical level. The event analyzer 116 can further update the GUI 126 to include a second list of the identified events, where unique and repeated events are each displayed in a single respective entry.

The event visualization system 104 can provide a variety of benefits over existing techniques for event visualization. In one aspect, events from a plurality of condition monitoring systems 102 can be included in the event data 112 and visualized. In contrast, existing condition monitoring systems can be configured to only visualize event data acquired at their local site and cannot visualize events experienced by assets of other sites.

In another aspect, the event analyzer 116 can be further configured to update the GUI 126 to display a list of events corresponding to assets 106 within the selected hierarchical level. This list can include unique events and repeated events. In contrast with existing condition monitoring systems, however, repeated events can be identified and aggregated into a single list entry. The ability to aggregate repeated events can improve the efficiency of operators employing the event visualization system 104, as repeated events can be reviewed together without the need for additional searching.

In a further aspect, the GUI 126 can be updated to display detailed data regarding an event of the event list in response to an operator selection. In contrast, existing condition monitoring systems can lack the ability to obtain and display such detailed event data, or at the very least, can require an operator to switch between multiple applications. The ability to view detailed event data without cumbersome application switching can further improve the efficiency of operators employing the event visualization system 104.

In certain embodiments, events can pertain to alarms (e.g., an operating parameter that is outside of a normal operating range). Under some circumstances, an alarm can be indicative of a problem with the monitored asset, and it can be desirable to address such alarms in order to avoid asset shutdown and/or damage. Accordingly, the GUI 126 can be further updated to display one or more recommended actions in combination with an alarm event. Beneficially, by displaying recommendations in combination with alarm events, the event visualization system 104 can assist operators in determining courses of action to address an alarm events and allow faster resolution of such alarm events.

Figure 2:
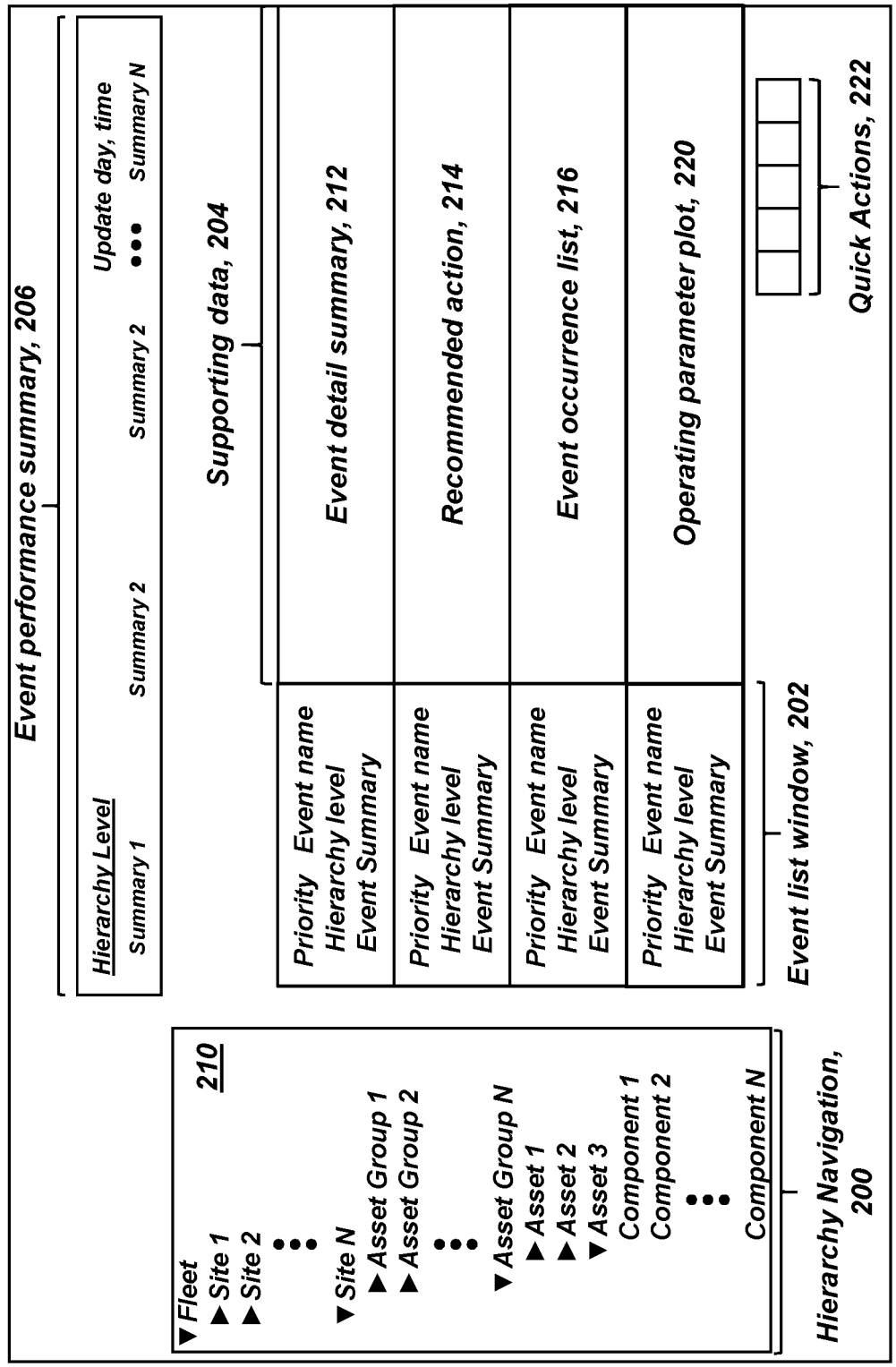
FIG. 2 is a schematic diagram illustrating one exemplary embodiment of a graphical user interface (GUI) generated by the event analyzer of FIG. 1 including a first window (e.g., 202) presenting a hierarchical list of assets of a fleet (e.g., fleet level, site level, group level, machine/component level, etc.) and a second window (e.g., 204) listing unique events and aggregated recurring events occurring within a selected level within the hierarchical list, and a third window providing detailed supporting data regarding an event selected from the second window.

The discussion below provides exemplary embodiments of the GUI 126 generated by the event analyzer 116 with regards to FIGS. 2, 3A, and 3B. FIG. 2 is a schematic diagram illustrating one exemplary embodiment of the GUI 126. As discussed in detail below, the GUI 126 can be configured to display one or more of a first window 200, a second window 202, a third window 204, and a fourth window 206 in any combination.

The GUI 126 can be configured to display a hierarchical list of assets 210 within the first window 200. As shown, the hierarchical list of assets 210 includes a plurality of levels, such as a fleet level, a site level, an asset group level, an asset level, and a component level.

The GUI 126 can be configured to receive a user selection (e.g., user selection 124) of a level of the hierarchical list of assets 210. In response to receipt of this selection, the event analyzer 116 can determine the assets 106 and corresponding events associated with the selected hierarchical level.

As discussed above, the highest level is the fleet level. Thus, selection of the fleet level includes all assets 106 of the fleet (e.g., all assets within each site) and all events of the fleet.

The second highest level is the site level and it can include one or more sites (e.g., site 1, site 2, . . . site N). Thus, selection of a site of the site level can include the assets 106 associated with the selected site and all events corresponding to the assets of the selected site.

The third highest level is the asset group level (e.g., asset group 1, asset group 2, . . . asset group N). Thus, selection of an asset group of the asset group level can include the assets 106 associated with the selected asset group and all events corresponding to the assets 106 of the selected asset group.

The fourth highest level is the asset level (e.g., asset 1, asset 2, asset N). Thus, selection of an asset 106 of the asset level includes the selected asset 106 and all events corresponding to the selected asset 106. Optionally, when asset components are monitored, selection of an asset 106 of the asset level can further include the components associated with the selected asset 106 and events corresponding to the selected asset 106.

The fifth highest level is the asset component level (e.g., component 1, component 2, component N). Thus, selection of a component of the component level includes the selected component and all events corresponding to the selected component.

The event analyzer 116 can be further configured to update the GUI 126 to display a second list of events associated with the selected hierarchical level of the hierarchical list of assets 210. This second list can include a single entry for unique events and a single entry for respective repeat events. As discussed above, examples of events can include, but are not limited to, alarms, system health of the condition monitoring system, instrument health of instruments (e.g., sensors 110) acquiring operating parameter measurements of respective monitored assets 106, and analytical health of logic used to identify the events.

As discussed above, the event data corresponding to each event can include at least one event parameter. In certain embodiments, an event can be classified as a repeat event when the at least one event parameter corresponding to the event matches all of the at least one event parameter of another event of the plurality of events. In general, such matching is designed to ensure that events classified as repeat events are evaluated on the same basis and occur under nominally identical conditions of the asset and, therefore, can be attributed to the same underlying cause. Furthermore, such events can exhibit little substantive variation with respect to one another. Therefore, grouping these repeat events in a single entry within the second list provides a significant efficient improvement without a substantive loss of event information.

In certain embodiments, the at least one event parameter can include measurement type and measurement point, asset state, event level, event source, and event type. Thus, under these circumstances, an event is classified as a unique event when the at least one of the above-listed event parameters of the event does not match another event. In contrast, under these circumstances, an event is classified as a repeat event when the least one event parameter corresponding to the event matches all of the above-listed event parameters of another event.

It can be appreciated that these event parameters are discussed for the purpose of example only and the at least one event parameter can be different and, optionally, can include greater or fewer event parameters.

In further embodiments, the second window 202 can further display selected event information corresponding to each of the listed events. As an example, as shown in FIG. 2, the event information includes the event priority, event name, hierarchy level, and an event summary.

The GUI 126 can be further configured to receive a second user selection of an event within the list displayed in the second window 202. In response to receipt of this selection, the event analyzer 116 can be configured to update the GUI 126 to display the third window 204 including at least a portion of the event data 112 that corresponds to the selected event. Examples of the event data can include, but are not limited to, an event summary 212, a recommended action 214, an event occurrence list 216, and an operating parameter plot 220.

Figure 3A:
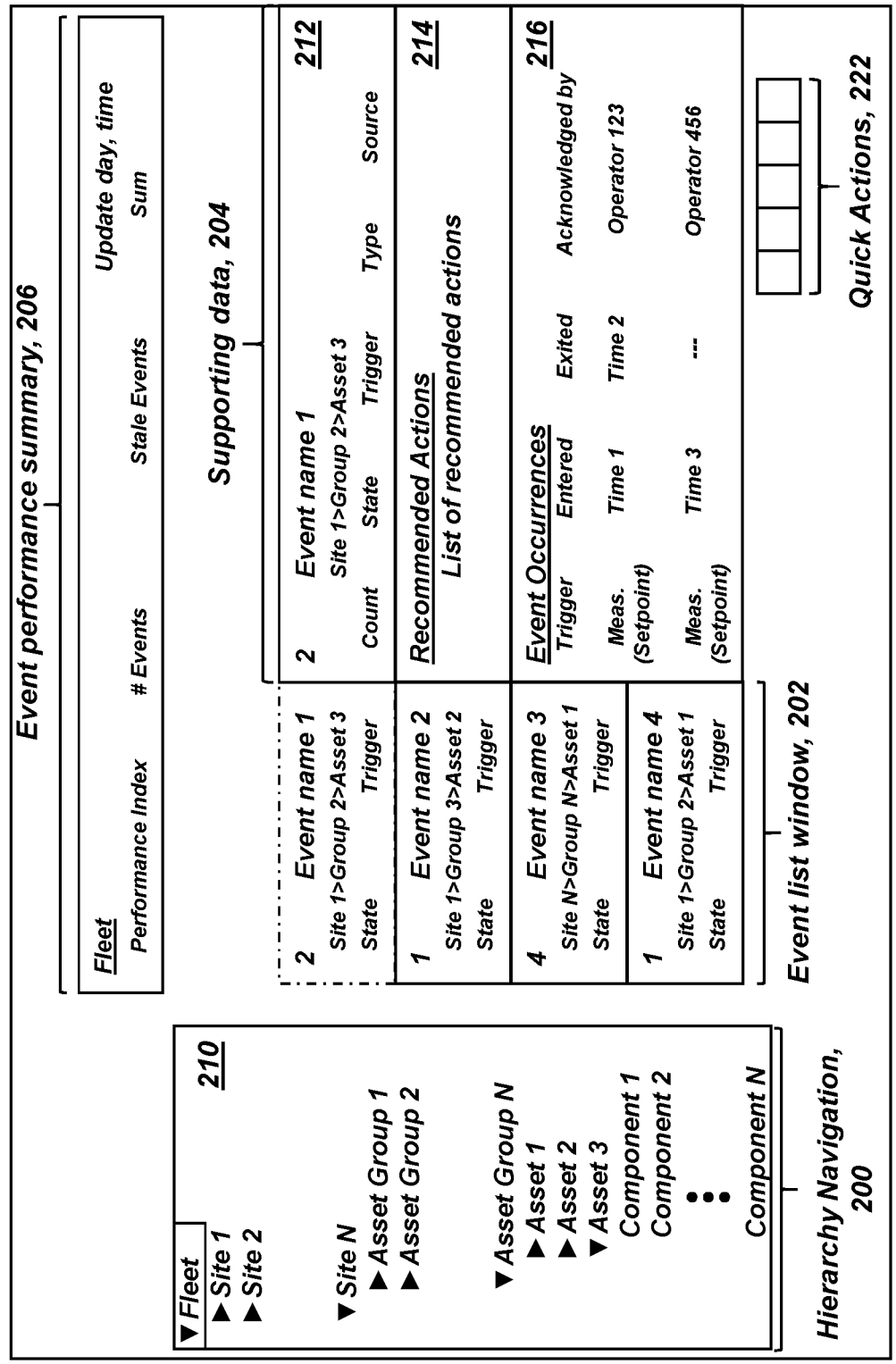
FIG. 3A is a schematic diagram illustrating the GUI of FIG. 2 after selection of a hierarchical level from the list in the first window and an event from the list in the second window.
Figure 3B:
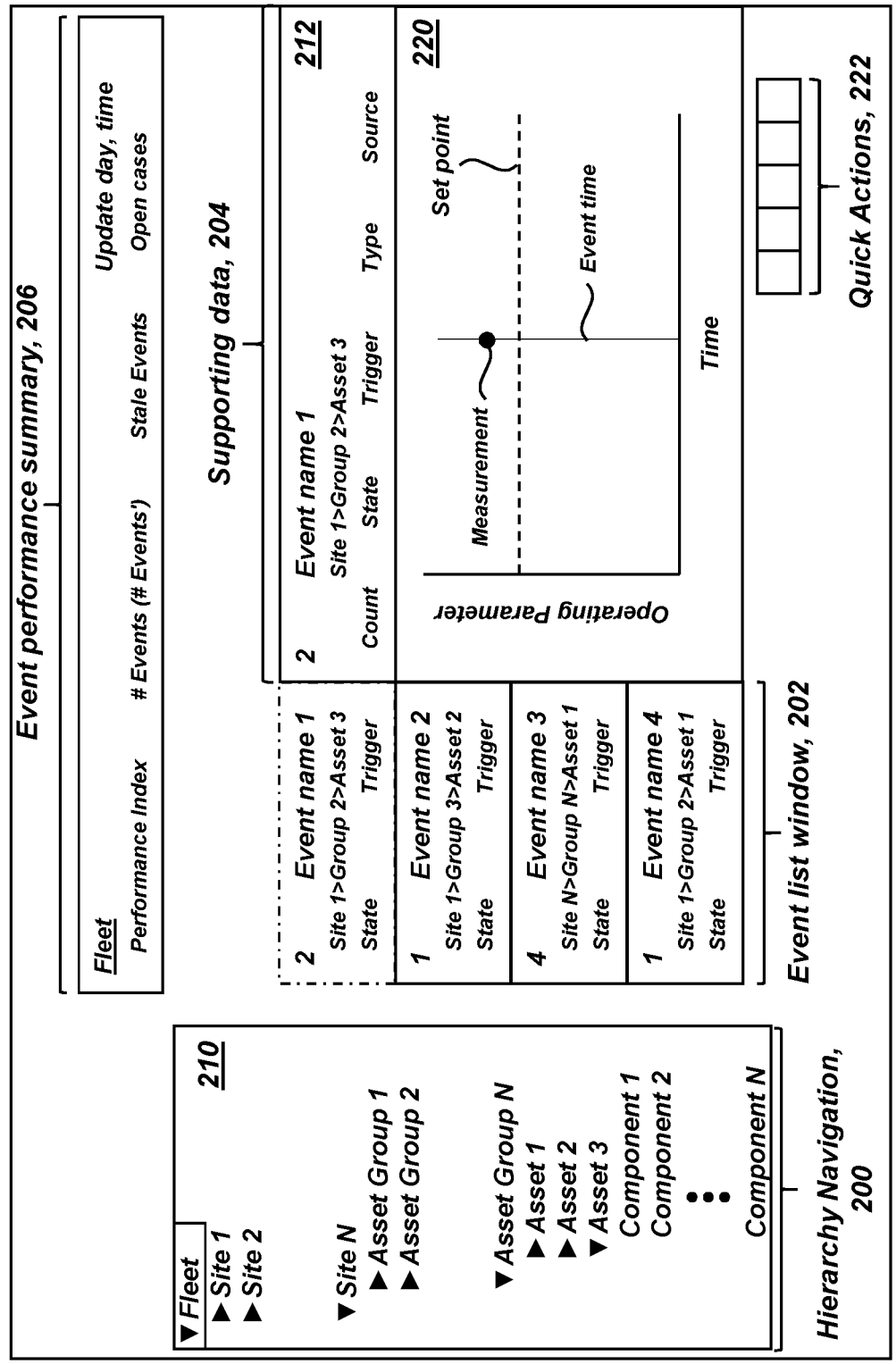
FIG. 3B is a schematic diagram illustrating the GUI of FIG. 3 further including a plot of one or more operating parameter measurements corresponding to the event selected in the second window.

A representative example is further illustrated FIGS. 3A-3B. As shown, the fleet hierarchy level is selected within the first window 200 and corresponding events are illustrated in the second window 202. The "Event name 1" is the event further selected within the second window. An exemplary event detail summary 212 is shown in a first sub-window of the third window 204. As an example, the priority, event name, and the position of the selected event within the asset hierarchy of the fleet is further illustrated.

Embodiments of further event data summarized in the event detail summary 212 can be based upon the most recent occurrence of the event. Non-limiting examples of summarized event data can include, but is not limited to, an event occurrence count, the asset state (startup, running (normal operation), shutdown, etc.), the event trigger value (alone or in combination with a measured operating parameter value causing the event to be triggered), the event type (e.g., alarm, system health, instrument health, or analytical health), and the event source. In the case of a uniquely selected event, the most recent occurrence will be the only occurrence within the event data corresponding to the selected event. Thus, under these circumstances, the count adopts a value of 1.

In certain embodiments, recommended actions are shown in a second sub-window of the third window 204. The recommended actions corresponding to respective events can be determined by the condition monitoring system 102 and included with the event data 112. In certain embodiments, the recommendations can be determined by the condition monitoring systems 102 and provided with the event data 112. In other embodiments, an operator can employ the event visualization system 104 to associate recommendations with specific events. In one example, a recommendation can suggest that specific maintenance be performed on an asset 106. In another example, a recommendation can suggest operation of an asset 106 within specified operating parameters.

An exemplary list of event occurrences 216 is shown in a third sub-window of the third window 204. In the case of a uniquely selected event, the most recent occurrence will be the only occurrence within the event data corresponding to the selected event. Thus, under these circumstances, only a single occurrence will be displayed. In contrast, the case of a repeat selected event, all of the occurrences within the event data corresponding to the selected repeat event can be displayed.

For each occurrence, selected event data can be displayed. As shown in FIG. 3A, the event data can include event parameters such as trigger. As an example, the event occurrence list 216 can include the event trigger value (alone or in combination with a measured operating parameter value causing the event to be triggered), event entry (start) and exit (stop) times, and, optionally, an operator acknowledgement of the selected event (e.g., via a quick action, discussed in greater detail below).

In certain embodiments, a plot of one or more measured operating parameters of the asset 106 as a function of time is shown in a fourth sub-window of the third window 204. As shown, the measured operating parameter(s) can include one or more operating parameter measurements acquired before, during, and/or after the selected event. Optionally, one or more set points can be overlaid on the plot. It can be appreciated that the plot can display other data in any format as necessary.

The event analyzer 116 can be further configured to update the GUI 126 to display a fourth window 206 in response to receipt of the first user selection of a level of the hierarchical list of assets 210. As an example, the fourth window 206 can include a performance summary at the selected hierarchy level based upon the portion of the event data 112 corresponding to the first plurality of events.

A representative example of the fourth window is further illustrated FIGS. 3A-3B. Continuing the example above, the fleet hierarchy level is selected within the first window 200 and a corresponding summary of the assets of the fleet hierarchy level is illustrated in the second window 202. As shown, the performance summary includes a performance index, a number of events (alone or in combination with a number of unacknowledged events), a number of stale events (e.g., events that have gone without acknowledgement for a predetermined amount of time), and the like.

In additional embodiments, the event analyzer 116 can be further configured to include user interface objects 222 corresponding to one or more quick actions within the generated GUI 126. The functionality of the user interface objects 222 can adopt a variety of configurations. In one embodiment, quick actions can pertain to alarm management. Examples can include, but are not limited to, alarm acknowledgement, alarm suppression, resetting a latched alarm, etc. In a further embodiment, quick actions can pertain to case management, such as case creation or case assignment. As an example, under circumstances where an operator has a case where they are managing the status/maintenance of a specific asset 106 and a new event is identified that is related to the case, the operator can use the quick actions to assign that event to the case to gather all supporting data. In another example, a new case could be created after a new event is identified. In a further embodiment, quick actions can pertain to navigation within the GUI 126. (e.g., the operating parameter plot 220). Beneficially, the ability to create and deploy quick actions enables a degree of customization of the GUI 126 and can facilitate better operator experiences.

It can be appreciated that discussion of the event parameters and corresponding summaries for display within the GUI 126 is presented solely for the sake of example, and the event parameters can be different from those illustrated and, optionally, can include greater or fewer event parameters.

Figure 4:
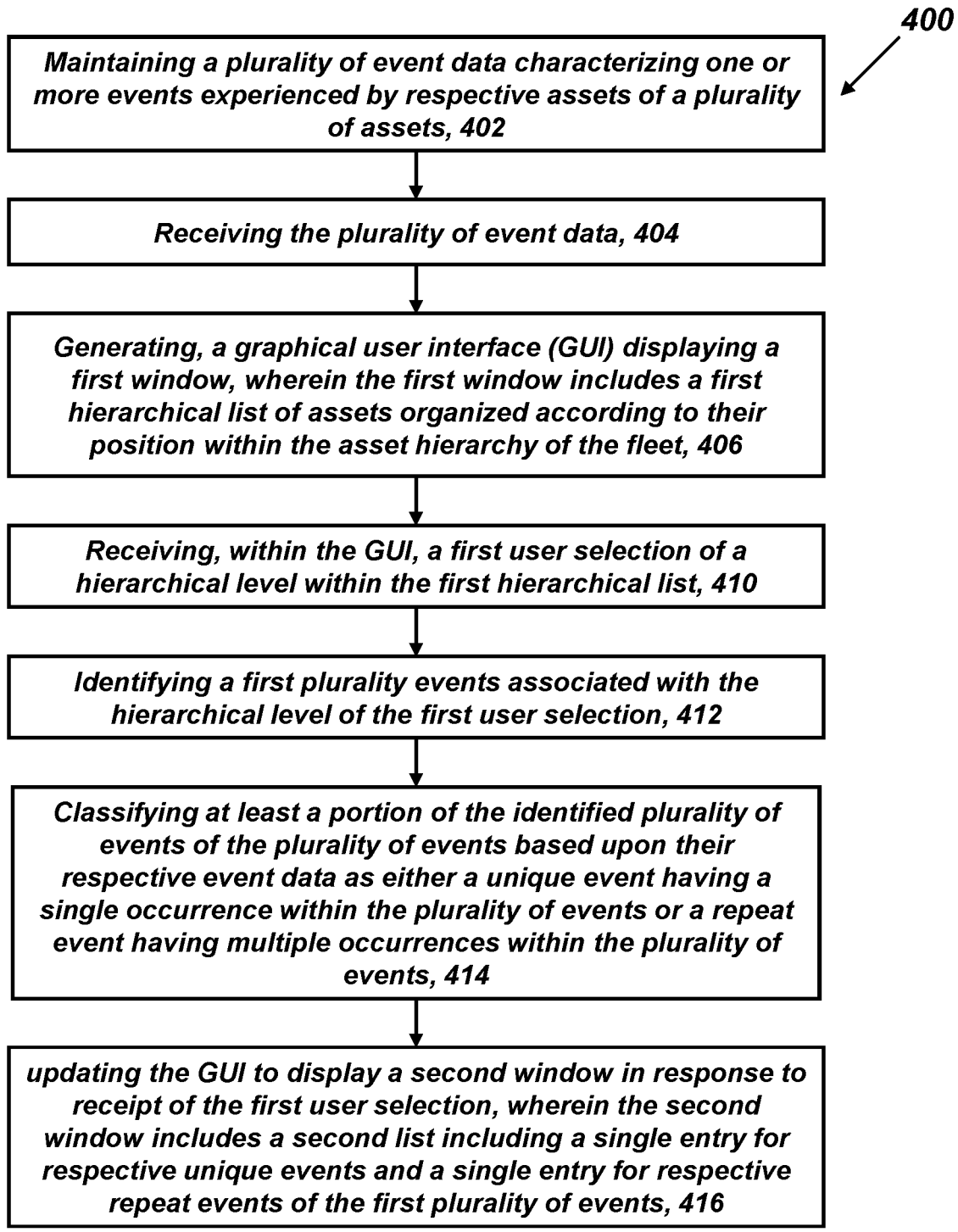
FIG. 4 is a flow diagram illustrating one exemplary embodiment of a method for visualization of events for condition monitoring.

FIG. 4 is a flow diagram illustrating one exemplary embodiment of a method 400 for improved visualization of events for condition monitoring. As shown, the method 400 includes operations 402-416 and are discussed below with respect to FIGS. 1-3B. It can be appreciated that, in alternative embodiments, the method can include greater or fewer operations and/or performed in a different order than illustrated in FIG. 4.

In operation 402, a plurality of event data (e.g., event data 112) characterizing one or more events experienced by respective assets of the plurality of assets 106 can be maintained (e.g., by the event visualization system 104). In an embodiment, the event data 112 can be maintained by the historian 120. The plurality of assets 106 can be distributed among different sites of a fleet. In an embodiment, an event can be at least one of an alarm, a condition monitoring system health event, an instrument health event, and an analytical health.

The event data can include at least a location of the selected asset 106 within an asset hierarchy of the fleet and at least one event parameter corresponding to the event. In an embodiment, the at least one event parameter can include at least one of a measurement type, a measurement point, an event type, an event level, an event source, and an asset state. In further embodiments, the event data can include measured operating data (e.g., measured operating parameters) related to respective events. As an example, the measured operating data can be one or more operating parameters measured at about the same time, before, and/or after respective events.

In operation 404, the plurality of event data can be received by one or more processors (e.g., the event analyzer 116).

In operation 406, the event analyzer 116 can generate a graphical user interface (GUI) 126 displaying the first window 200. The first window 200 can include a hierarchical list of assets organized according to their position within the asset hierarchy of the fleet. As an example, the asset hierarchy of the fleet can include two or more of a fleet level, a site level, an asset group level, and an asset level.

In operation 410, a first user selection of a hierarchical level within the hierarchical list can be received by the event analyzer 116. As an example, the GUI 126 an operator can view the GUI 126 and provide the first user selection with the user computing device 122. The user computing device 122 can be in communication with the event analyzer 116 (e.g., via a network) and transmit the first user selection to the event analyzer 116 upon entry.

In operation 412, the event analyzer 116 can identify a plurality events associated with the hierarchical level of the first user selection.

In operation 414, the event analyzer 116 can classify at least a portion of the identified plurality of events based upon their respective event data. In certain embodiments, all of the identified plurality of events can be classified. As an example, events can be classified as either a unique event having a single occurrence within the plurality of events or a repeat event having multiple occurrences within the plurality of events.

In one embodiment, an event can be classified by the event analyzer 116 as a unique event when the at least one event parameter corresponding to the event does not match another event of the plurality of events. In another embodiment, an event can be classified by the one or more processors as a repeat event when the least one event parameter corresponding to the event matches all of the at least one event parameter of another event of the plurality of events.

In operation 416, the event analyzer 116 can update the GUI 126 to display the second window 202 in response to receipt of the first user selection. The second window 202 can include a second list including a single entry for respective unique events and a single entry for respective repeat events of the first plurality of events.

In additional embodiments, a second user selection of an event from the second list can be received within the GUI 126. In response to receipt of the second user selection, the event analyzer 116 can update the GUI 126 to display at least one third window 204. The third window 204 can include event data corresponding to the selected event.

The third window 204 can adopt a variety of configurations. In one embodiment, the third window 204 can be in the form of first sub-window (e.g., event detail summary 212) that displays a most recent occurrence of the selected event including a first portion of the at least one event parameter.

In another embodiment, the event data can further include at least one recommendation. Under this circumstance, the third window 204 can be in the form of the second sub-window (e.g., recommended action 214) displaying the at least one recommendation.

In a further embodiment, the third window 204 can be in the form of the third sub-window (e.g., event occurrence list 216) displaying all occurrences of the selected event and including respective second portions of the at least one event parameter for each occurrence.

In an additional embodiment, the third window 204 can be in the form of the fourth sub-window (e.g., operating parameter plot 220) including a plot of the measured operating data. The measured operating data can be before, during, and/or after the selected event.

Exemplary technical effects of the methods, systems, and devices described herein include, by way of non-limiting example improved visualization of events for condition monitoring. In one aspect, unique and non-unique (e.g., recurring) events can be identified and recurring events can be aggregated together and displayed in a graphical user interface. Therefore, unnecessary display of redundant events can be avoided, facilitating ease of review of listed events. In another aspect, the display of events in this manner is not limited to events from a single site but multiple sites, up to an entire fleet. This manner of data visualization can be particularly advantageous when listing events across an entire fleet, as the number of listed events increases significantly as compared to display of events from one or a small number of sites. In a further aspect, the graphical user interface can be further configured to display supporting information in the form of summary views and various detailed views (e.g., all recurring events, data plots illustrating measured operating parameters within a time range including respective events, etc.) This enables operators to quickly review events and supporting data without the need to sort through a large list of nuisance events.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magnetooptical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. An asset management system comprising:
  a historian configured to maintain a plurality of event data characterizing one or more events experienced by respective assets of a plurality of assets, wherein the plurality of assets are distributed among different sites of a fleet, and wherein the plurality of event data includes at least a location of an asset of the plurality of assets within an asset hierarchy of the fleet and at least one event parameter corresponding to an event of the one or more events; and
  an event analyzer including one or more processors configured to receive the plurality of event data and to perform operations comprising:
    generating a graphical user interface (GUI) displaying a first window, wherein the first window includes a hierarchical list of assets organized according to their position within the asset hierarchy of the fleet;
    receiving, within the GUI, a first user selection of a hierarchical level within the hierarchical list;
    identifying a plurality of events associated with the hierarchical level of the first user selection;
    classifying at least a portion of the identified plurality of events based upon their respective event data as either a unique event having a single occurrence within the plurality of events or a repeat event having multiple occurrences within the plurality of events;
    updating the GUI to display a second window in response to receipt of the first user selection, wherein the second window includes a list including a single entry for respective unique events and a single entry for respective repeat events of a first plurality of events; and updating the GUI to display a fourth window in response to receipt of the first user selection, wherein the fourth window includes a performance summary at the selected hierarchy level based upon the event data corresponding to the first plurality of events.

2. The asset management system of claim 1, further comprising performing operations by the event analyzer including:

receiving, within the GUI, a second user selection of an event from the second list; and updating the GUI to display a third window in response to receipt of the second user selection, wherein the third window includes event data corresponding to the selected event.

3. The asset management system of claim 2, wherein the third window comprises a first sub-window displaying a most recent occurrence of the selected event including a first portion of the at least one event parameter included in the plurality of event data.

4. The asset management system of claim 2, wherein the event data further comprises at least one recommendation, and wherein the third window comprises a second sub-window displaying the at least one recommendation.

5. The asset management system of claim 2, wherein the third window comprises a third sub-window displaying all occurrences of the selected event and each displayed occurrence can include respective second portions of the at least one event parameter included in the plurality of event data for each occurrence.

6. The asset management system of claim 2, wherein the event data further comprises measured operating data regarding one or more of the plurality of assets before, during, and after the selected event and wherein the third window comprises a fourth sub-window including a plot displaying at least a portion of the measured operating data.

7. The asset management system of claim 1, wherein the asset hierarchy of the fleet includes two or more of a fleet level, a site level, an asset group level, or an asset level.

8. The asset management system of claim 1, wherein an event is classified as a unique event when the at least one event parameter corresponding to the event does not match another event of the plurality of events, and, wherein an event is classified as a repeat event when the at least one event parameter included in the plurality of event data corresponding to the event matches all of at least an additional event parameter included in the plurality of event data of another event of the plurality of events.

9. The asset management system of claim 8, wherein the at least one event parameter comprises at least one of a measurement type, a measurement point, an event type, an event level, an event source, or an asset state.

10. The asset management system of claim 1, wherein an event is at least one of an alarm, a condition monitoring system health event, an instrument health event, and an analytical health event.

11. A method of asset management, comprising:

maintaining, by one or more processors, a plurality of event data characterizing one or more events experienced by respective assets of a plurality of assets, wherein the plurality of assets are distributed among different sites of a fleet, and wherein the event data includes at least a location of an asset of the plurality of assets within an asset hierarchy of the fleet and at least one event parameter corresponding to the event; and receiving, by the one or more processors, the plurality of event data;

generating, by the one or more processors, a graphical user interface (GUI) displaying a first window, wherein the first window includes a hierarchical list of assets organized according to their position within the asset hierarchy of the fleet;

receiving, within the GUI, a first user selection of a hierarchical level within the hierarchical list;

identifying, by the one or more processors, a plurality events associated with the hierarchical level of the first user selection;

classifying, by the one or more processors, at least a portion of the identified plurality of events based upon their respective event data as either a unique event having a single occurrence within the plurality of events or a repeat event having multiple occurrences within the plurality of events;

updating, by the one or more processors, the GUI to display a second window in response to receipt of the first user selection, wherein the second window includes a list including a single entry for respective unique events and a single entry for respective repeat events of a first plurality of events; and updating the GUI to display a fourth window in response to receipt of the first user selection, wherein the fourth window includes a performance summary at the selected hierarchy level based upon the event data corresponding to the first plurality of events.

12. The method of claim 11, further comprising:

receiving, within the GUI, a second user selection of an event from the second list; and updating, by the one or more processors the GUI to display a third window in response to receipt of the second user selection, wherein the third window includes event data corresponding to the selected event.

13. The method of claim 12, wherein the third window comprises a first sub-window displaying a most recent occurrence of the selected event including a first portion of the at least one event parameter.

14. The method of claim 12, wherein the event data further comprises at least one recommendation, and wherein the third window comprises a second sub-window displaying the at least one recommendation.

15. The method of claim 12, wherein the third window comprises a third sub-window displaying all occurrences of the selected event and each displayed occurrence can include respective second portions of the at least one event parameter for each occurrence.

16. The method of claim 12, wherein the event data further comprises measured operating data regarding one or more of the plurality of assets before, during, and after the selected event and wherein the third window comprises a fourth sub-window including a plot displaying at least a portion of the measured operating data.

17. The method of claim 11, wherein the asset hierarchy of the fleet includes two or more of a fleet level, a site level, an asset group level, or an asset level.

18. The method of claim 11, wherein an event is classified by the one or more processors as a unique event when the at least one event parameter corresponding to the event does not match another event of the plurality of events, and wherein an event is classified by the one or more processors as a repeat event when the at least one event parameter corresponding to the event matches all of the at least one event parameter of another event of the plurality of events.

19. The method of claim 18, wherein the at least one event parameter comprises at least one of a measurement type, a measurement point, an event type, an event level, an event source, or an asset state.

20. The method of claim 11, wherein an event is at least one of an alarm, a condition monitoring system health event, an instrument health event, and an analytical health event.

* * * * *